Oct. 13, 1959 F. A. MORROW 2,908,512
HOSE FITTING HAVING MALE OR FEMALE COUPLING MEANS
Filed Jan. 18, 1957 3 Sheets-Sheet 1

INVENTOR.
FRED A. MORROW
BY M. A. Hobbs
ATTORNEY

Oct. 13, 1959  F. A. MORROW  2,908,512
HOSE FITTING HAVING MALE OR FEMALE COUPLING MEANS
Filed Jan. 18, 1957  3 Sheets-Sheet 2

INVENTOR.
FRED A. MORROW
BY M. A. Hobbs
ATTORNEY

Oct. 13, 1959     F. A. MORROW     2,908,512
HOSE FITTING HAVING MALE OR FEMALE COUPLING MEANS
Filed Jan. 18, 1957     3 Sheets-Sheet 3

INVENTOR.
FRED A. MORROW
BY *M. A. Hobbs*
ATTORNEY

United States Patent Office 2,908,512
Patented Oct. 13, 1959

2,908,512
HOSE FITTING HAVING MALE OR FEMALE COUPLING MEANS

Fred A. Morrow, Plymouth, Ind.

Application January 18, 1957, Serial No. 634,877

1 Claim. (Cl. 285—12)

The present invention relates to a novel hose coupling and to a method of assembling the coupling on the ends of hose.

One of the principal objects of the present invention is to provide a relatively simple and compact hose coupling which can be readily and securely attached to the end of a hose and which will take a substantial amount of abuse without becoming damaged or removed from the hose.

Another object of the invention is to provide a one-piece ferrule and tail piece unit for a hose coupling which can be used to form either the male or female coupling and which is secured to the end of the hose by reforming only the ferrule inwardly to firmly clamp the hose against the tail piece.

Still another object of the invention is to provide a ferrule and tail piece combination which is adapted to be used with the conventional female coupling element or with a tube or pipe threaded into the tail piece.

A further object of the present invention is to provide a relatively simple method of assembling and securely attaching hose couplings of the aforesaid type onto the end of a hose.

Another object of the invention is to provide a hose ferrule and tail piece combination which is readily adaptable to various uses and installations.

Additional objects and advantages will become apparent from the following description and accompanying drawings, wherein.

Figure 1:
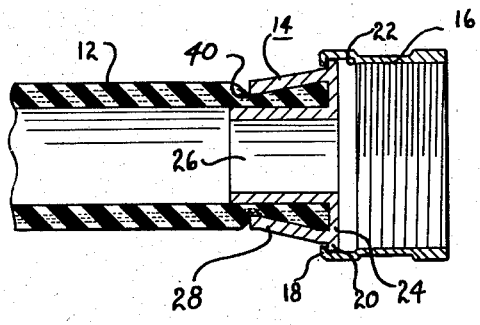
Figure 1 is a longitudinal cross sectional view through my hose coupling and a section of hose on which the coupling is mounted.

Referring more specifically to the drawings, numeral 12 designates a conventional flexible rubber and rubberized fabric hose frequently used as garden or lawn hose or low pressure air and hydraulic fluid hose, 14 designates a plug member secured to the end of the hose and 16 a conventional female part rotatably attached to member 14 by an annular flange 18 on part 16 engaging an annular flange 20 on member 14. The female part is prevented from slipping off member 14 by shoulder 22 formed on the inner surface adjacent the threaded section of said part. The threads on the internal surface of the female part may be standard size for garden hose and the like and a gasket is used between the end of member 14 and the male portion of the connecting hose coupling.

Figures 6, 7:
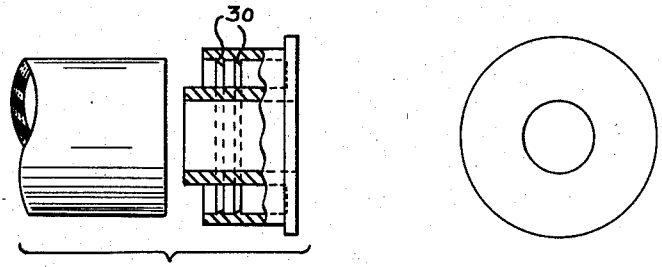
Figure 6 is a partial cross sectional view of the end of a section of hose and my coupling before the two elements are assembled.
Figure 7 is an end view of a portion of my coupling.

Member 14 is composed of brass, aluminum, copper or other readily deformable metal and consists of a washer-like head portion 24, tail piece 26 for slipping into the hose, and ferrule 28 for slipping over the outside surface of the hose, and after being reformed, clamping the side wall of the hose against the tail piece. The head portion, tail piece and ferrule are formed integrally as one piece from a blank of metal by any one of the well known metal forming operations, such as stamping, forging or impact extrusion operations, into the form shown in Figures 2 and 6. In this form the tail piece and ferrule are coaxial and cylindrical in shape. In some installations it may be desirable to provide a series of annular ridges 30 or the like on the inner surface of the ferrule for gripping the hose more firmly after the ferrule has been reformed around the end of the hose.

Figure 2:
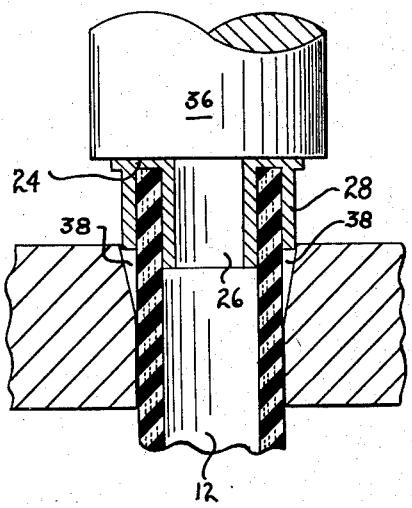
Figure 2 is a longitudinal cross sectional view through the hose coupling and section of hose and through a fragmentary portion of the die for attaching the coupling to the hose, showing the relationship of said elements before the coupling is secured to the hose.
Figure 3:
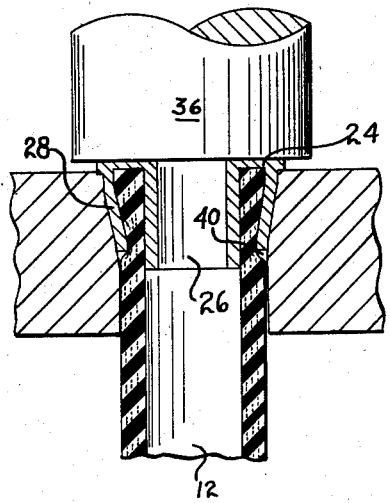
Figure 3 is a longitudinal cross sectional view through the coupling and hose and through a portion of the die, showing the relationship to said elements after the coupling has been secured to the hose.
Figure 4:
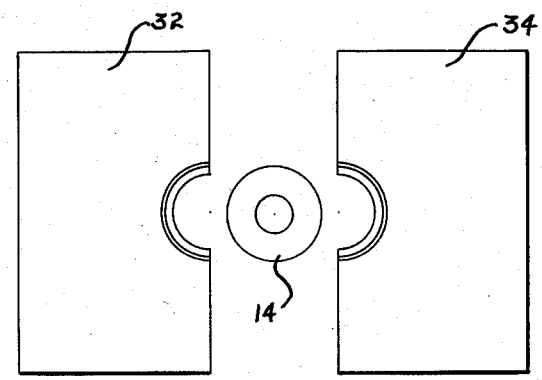
Figure 4 is a plan view of the die for attaching my coupling to the end of hose, showing my coupling in the loading position.
Figure 5:
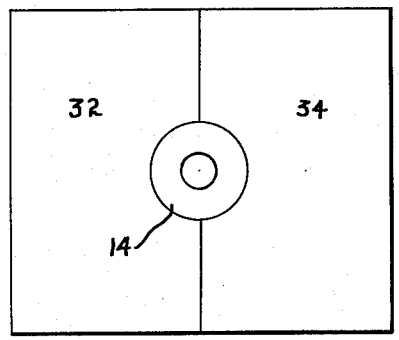
Figure 5 is a plan view of the die, showing the relationship of parts and coupling during the operation of attaching the coupling to the hose.

One of the important features of the present invention is the method by which member 14 is secured to the end of the hose. This method and the equipment used in practicing the method are illustrated in Figures 2, 3, 4 and 5. In Figure 2 member 14 is shown mounted on the end of a hose section in a die ready for the joining operation, the die first having been closed around the hose as shown in Figures 4 and 5. With the die members 32 and 34 in closed position the hose is free to move longitudinally between said members, although the hole between the die members is preferably of substantially the same diameter as the hose. The final attaching step of the operation is performed by a plunger 36 which presses member 14 into the conical recess 38 extending from the plunger side of die members 32 and 34 inwardly for a distance approximately equal to the length of the ferrule. As member 14 is forced inwardly the hose moves longitudinally therewith and the ferrule is reformed, progressively from its free end, into the contour of the recess producing smooth, generally frusto-conical shaped sides with the free edge thereof on substantially the same plane as the outer surface of the hose, thus eliminating any protruding edges which might catch on foreign objects and cause the member to be accidentally pulled from the end of the hose. Since in the present construction member 14 is secured to and held firmly onto the end of the hose by the ferrule clamping the hose side walls against the external surface of the tail piece, it is important that the tail piece be somewhat longer than the ferrule so that effective clamping action is provided adjacent the free end of the ferrule as shown at numeral 40.

Die members 32 and 34 can be moved between open and closed positions by any well known mechanism operated either mechanically, hydraulically or pneumatically and locked or held in closed position by any suitable means. Likewise plunger 36 can be operated by any suitable mechanism.

Figures 8, 9:
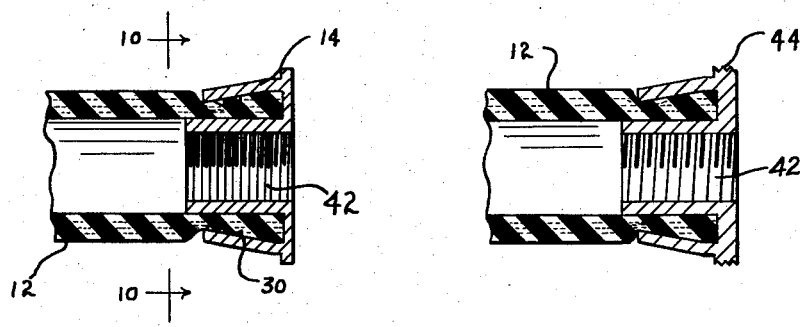
Figure 8 is a longitudinal cross sectional view of the coupling and hose assembly of the parts shown in Figure 6.
Figure 9 is a longitudinal cross sectional view of my coupling and a section of hose, showing a modified form of the invention.
Figure 10:
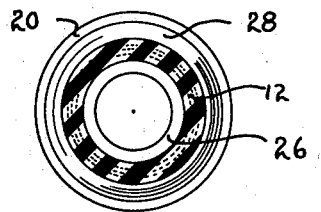
Figure 10 is a cross sectional view of the coupling and hose assembly, taken on line 10—10 of Figure 8.

Member 14 can be used separately from female part 16 in the manner shown in Figure 8 to form part of a joint between the hose and a threaded pipe or tube. This type of construction is particularly useful in making connections between laundry appliances and water outlets where there is only a limited amount of space for the connection and where it is desirable to place the hose connection against the wall. The threads 42 on the internal surface of the tail piece can be provided on any one of the embodiments shown in the drawings, as illustrated in Fig. 9, thus permitting more than one type of connection to be made from each coupling. The construction of member 14 and the method of mounting it on the hose is the same as those described previously herein.

Figure 11:
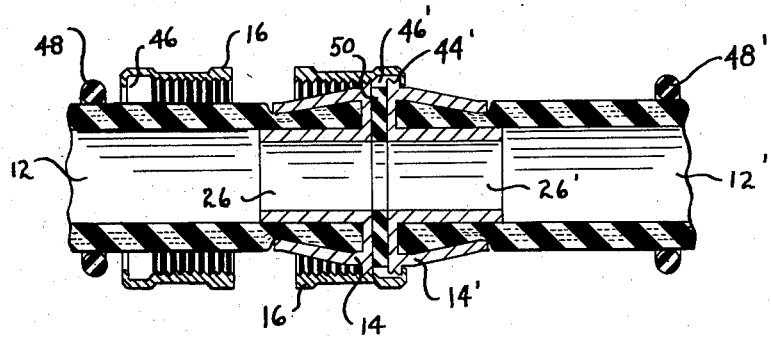
Figure 11 is a longitudinal cross sectional view of two connected couplings of the type employing the element of the modified form shown in Figure 9.

The construction of member 14 is particularly adapted for use in forming both the male and female coupling. The structure previously described herein for member 14 can be used as the male member of the coupling by merely threading the periphery of head portion 24 as shown at numeral 44 of Figure 9, and with this threaded portion, member 14 can be used with the female portion by merely providing an annular recess or groove 46 in the female portion of sufficient size to permit the threaded portion 44 to become fully disengaged from the threads in the female portion, as shown in Figure 11 at numerals 44' and 46'. When member 14 of one coupling is to be used as the male portion, the female portion of said coupling is unscrewed from the male portion and moved to a position along the hose. To prevent the unused female portion from slipping away from the connection, a stop means, such as a rubber ring 48 secured to the hose, is preferably provided a short distance from the coupling. In completing the connection the two members 14 and 14' are placed face to face as shown in Figure 11 with a gasket 50 disposed therebetween, and one of female portions 16 is tightened onto the opposite male portion as it rotates freely around flange 20 of the respective coupling. This male-female type coupling can be made with very little additional manufacturing cost and makes it possible to complete a hose connection even though the male or female portion of one of the couplings has been damaged to the extent that it is unusable.

While several modifications have been described herein in my hose coupling, further modifications and changes can be made without departing from the scope of the present invention.

I claim:

A one piece hose attachment of substantially uniform thickness throughout, comprising a flat disc-shaped member having a central hole and an externally threaded periphery, a tubular tail piece extending from said member around said hole, the internal surface of said hole and tail piece being threaded, and a deformable metal cylindrical ferrule joined to said member and being concentric with and overlying said tail piece, said ferrule being shorter than said tail piece and spaced inwardly from the threaded periphery of said member and adapted to be tapered inwardly, whereby various attachment members may be connected to the hose attachment.

References Cited in the file of this patent

UNITED STATES PATENTS

| | | |
|---|---|---|
| 869,662 | Snyder | Oct. 29, 1907 |
| 1,648,026 | Murray | Nov. 8, 1927 |
| 1,872,540 | White | Aug. 16, 1932 |
| 2,054,362 | Cowles | Sept. 15, 1936 |
| 2,437,933 | Brennan | Mar. 16, 1948 |
| 2,481,730 | Doerr | Sept. 13, 1949 |
| 2,704,074 | Butler | Mar. 15, 1955 |
| 2,797,562 | Forgash | July 2, 1957 |

FOREIGN PATENTS

| | | |
|---|---|---|
| 716,796 | Great Britain | Oct. 13, 1954 |